(12) United States Patent
Jeong

(10) Patent No.: US 7,380,958 B2
(45) Date of Patent: Jun. 3, 2008

(54) BACKLIGHT UNIT HAVING LAMPS DISPOSED WITH VARIOUS DISTANCES

(75) Inventor: In Suk Jeong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 36 days.

(21) Appl. No.: 11/167,220

(22) Filed: Jun. 28, 2005

(65) Prior Publication Data
US 2006/0002107 A1    Jan. 5, 2006

(30) Foreign Application Priority Data
Jun. 30, 2004    (KR) .................... 10-2004-0049923

(51) Int. Cl.
*F21S 4/00*    (2006.01)
(52) U.S. Cl. .................... 362/225; 362/613; 349/58
(58) Field of Classification Search ................ 362/225, 362/613, 604, 611, 614, 260, 217, 330, 97, 362/29, 30; 349/58–65
See application file for complete search history.

(56) References Cited
U.S. PATENT DOCUMENTS

| | | | | |
|---|---|---|---|---|
| 5,479,275 A | * | 12/1995 | Abileah | 349/5 |
| 5,947,579 A | * | 9/1999 | Horton et al. | 362/34 |
| 6,464,367 B2 | * | 10/2002 | Ito et al. | 362/613 |
| 6,527,414 B2 | * | 3/2003 | Moon | 362/249 |
| 6,641,419 B1 | * | 11/2003 | Richardson | 439/230 |
| 6,979,102 B2 | * | 12/2005 | You | 362/218 |
| 7,090,376 B2 | * | 8/2006 | Kang et al. | 362/225 |
| 7,134,767 B2 | * | 11/2006 | Liao et al. | 362/225 |
| 2005/0083711 A1 | * | 4/2005 | Wu et al. | 362/558 |

\* cited by examiner

*Primary Examiner*—Renee Luebke
*Assistant Examiner*—Gunyoung T. Lee
(74) *Attorney, Agent, or Firm*—McKenna Long & Aldridge LLP

(57) ABSTRACT

A backlight unit includes a plurality of lamps which generate a light; a case which houses the lamps; and a lamp holder that holds the lamps, the lamp holder being placed in the case, wherein a distance between first adjacent lamps is different from a distance between second adjacent lamps. Further preferred, a distance from a bottom surface of the case increases from an edge of the case to the center portion thereof.

17 Claims, 6 Drawing Sheets

BACKLIGHT UNIT HAVING LAMPS DISPOSED WITH VARIOUS DISTANCES

This application claims the benefit of the Korean Patent Application No. 10-2004-49923 filed in Korea on Jun. 30, 2004, which is hereby incorporated by reference in its entirety.

BACKGROUND OF THE INVENTION

1. Field of the Invention

The present invention relates to a backlight unit, and more particularly to a backlight unit with a lamp holder.

2. Description of the Related Art

Generally, liquid crystal display devices (LCDs) are increasingly being used because they are light, thin and consume low power. For example, liquid crystal display devices are used in office automation equipment, audio/video equipment, and so on. In a liquid crystal display device, light transmission is controlled in accordance with video signals applied to a plurality of control switches arranged in a matrix, thereby displaying a desired picture on a screen.

The LCD is not a self-luminous display device. It requires a light source, such as a backlight. There are two types of backlight for the LCD device: a direct type backlight and an edge type backlight. The edge type backlight, which is used in medium to small size liquid crystal display panels, has a lamp installed at an outer area of a flat panel to irradiate light in such a way that the light generated from the lamp is incident on the entire surface of the liquid crystal display panel through a transparent light guide panel. The direct type backlight, which is used in medium to large size liquid crystal display panels, has a plurality of lamps arranged in a plane, and a diffusion plate installed between the lamp and a liquid crystal display panel in order to irradiate a light onto a large and middle sized liquid crystal display panel.

FIG. 1 is a perspective view of a liquid crystal display device with a direct type backlight according to the related art. Referring to FIG. 1, the direct type liquid crystal display device includes a liquid crystal display panel 2 and a backlight unit which irradiates light onto the liquid crystal display panel 2. The liquid crystal display panel 2 has liquid crystal cells forming an active matrix between upper and lower glass substrates, and a thin film transistor installed for switching a video signal to each of the liquid crystal cells. A refractive index of each liquid crystal cell is changed in accordance with the video signal, thereby displaying a corresponding picture. A tape carrier package TCP (not shown) is stuck onto a lower substrate of the liquid crystal display panel 2. A driver integrated circuit IC is mounted on the TCP to apply a drive signal to the thin film transistor. Further, polarizing sheets 8 and 18 are each installed in front and rear surfaces of the liquid crystal display panel 2. The polarizing sheets 8 and 18 improve the viewing angle of a displayed picture.

The backlight unit includes a plurality of lamps 36. The lamps 36 receive power from an external power source, irradiate light onto the liquid crystal display panel 2, and are independently driven. A case 34 is provided to hold the lamps 36. A reflection plate 14 is installed between the lamps 36 and the case 34. The reflection plate 14 reflects light generated by the lamps 36, thereby preventing light leakage. A diffusion panel 12 is provided to diffuse light generated from the lamp 36 or reflected by the reflection plate 14 toward the liquid crystal display panel 2. A plurality of optical sheets 10 distributes the light diffused from the diffusion panel 12 onto the liquid crystal display panel 2, thereby improving the light efficiency.

Each of the lamps 36 includes a glass tube, an inert gas inside the glass tube, a cathode and an anode which are installed at both ends of the glass tube. The inert gas is charged in the inside of the glass tube, and a phosphorus is spread over the inner wall of the glass tube. In each of the lamps 36, an inverter applies an AC voltage to a high voltage electrode and a low voltage electrode. Electrons radiate from the low voltage electrode and collide with the inert gas inside the glass tube. The numbers of electrons increase according to a geometric progression. Then, the excess electrons cause an electric current to flow inside the glass tube, and excite the inert gas, which emits an ultraviolet ray. The emitted ultraviolet ray collides with luminous phosphorus spread over the inner wall of the glass tube, thereby radiating a visible ray.

A fixed gap is maintained between the lamps 36 in the holding case 34. The reflection plate 14 is arranged between an upper surface of the case 34 and the lamps 36, reflects the light generated from the lamps 36, and irradiates the generated light toward the liquid crystal display panel 2, thereby improving light efficiency. A diffusion pattern formed on the diffusion panel 12 diffuses the light generated from the lamps 36 or reflected by the reflection plate 14. The diffusion pattern causes the incident light to propagate toward the liquid crystal display panel 2 with a wide angle.

The optical sheets 10 increase the brightness of the diffused light from the diffusion panel 12, thereby improving the brightness of the liquid crystal display device. Further, light slantingly incident from the surface of the diffusion panel 12 and the reflection sheet 14 is vertically oriented by the optical sheets 10 toward the liquid crystal display panel 2. Thus, the optical sheets 10 act set the propagation direction of the light exiting from the surface of the optical sheets 10.

In the related art liquid crystal display device, a fixed distance is provided between the lamps 36. Moreover, the lamps 36 are installed at a fixed distance from the surface of the case 34. Accordingly, the related art liquid crystal device provides an uniform display brightness, thereby reducing visual fatigue as compared to a cathode ray tube CRT. On the other hand, experiments show that, for a user watching the screen, the focus of attention is the central portion of the screen. For example, with the amount of information transmitted to the user in mid to large size TV screen, the user focuses his attention on the central portion of the screen rather than on the edge. Thus, it is beneficial to emphasize brightness in the central portion of the screen. However, the arrangement of the lamps 36 in the related direct type backlight does not provide brightness enhancement in the central portion of the screen. The related art direct type backlight irradiates light with the same brightness toward the edges of the screen as in the center of the display. Thus, light from the related art direct type backlight is unnecessarily bright at the edges. Accordingly, power is wasted unnecessarily.

SUMMARY OF THE INVENTION

Accordingly, the present invention is directed to a backlight unit that substantially obviates one or more of the problems due to limitations and disadvantages of the related art.

An object of the present invention to provide a backlight unit that is brighter at a central portion of a liquid crystal display.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, a backlight unit includes a plurality of lamps which generate a light; a case that houses the lamps; and a lamp holder that holds the lamps, the lamp holder being placed in the case, wherein a distance between first adjacent lamps is different from a distance between second adjacent lamps.

In another aspect, a backlight unit includes a plurality of lamps which generate a light; a case that houses the lamps; a lamp holder that holds the lamps, the lamp holder being placed in the case, wherein a distance of each of the lamps from a bottom surface of the case increases from an edge of the case to a center portion thereof.

In another aspect, a liquid crystal display device includes a liquid crystal display panel; and a backlight unit that irradiates a light onto the liquid crystal display panel. The backlight unit includes a plurality of lamps that generate the irradiated light; a case that houses the lamps; a plurality of lamp holders at opposite ends of the case, the lamp holders holding the lamps, wherein a distance between first adjacent lamps is different from a distance between second adjacent lamps, and a distance of each of the lamps from a bottom surface of the case increases from an edge of the case to a center portion thereof.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
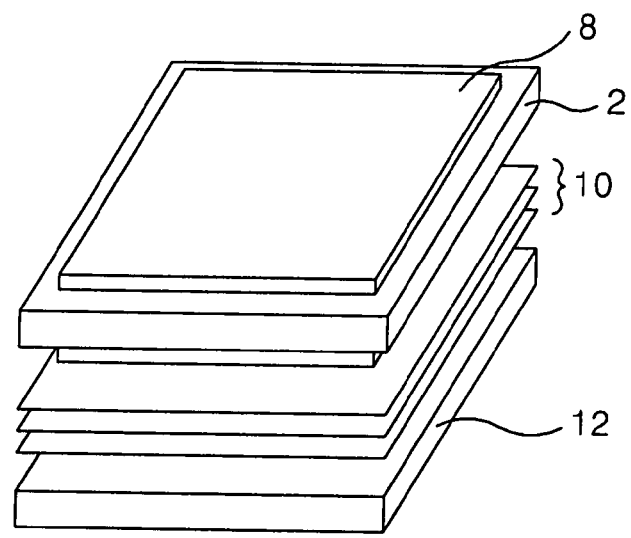
FIG. 1 is a perspective view representing a related art liquid crystal display device.
Figure 1:
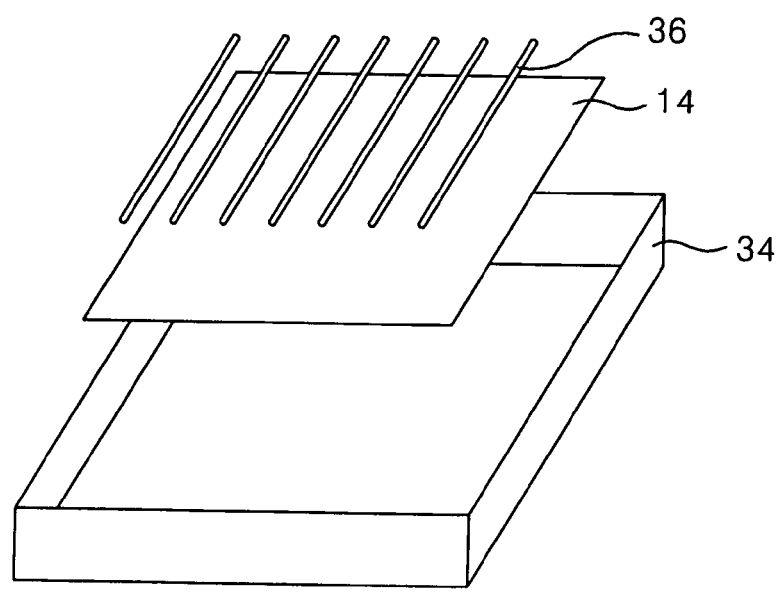
Figure 2:
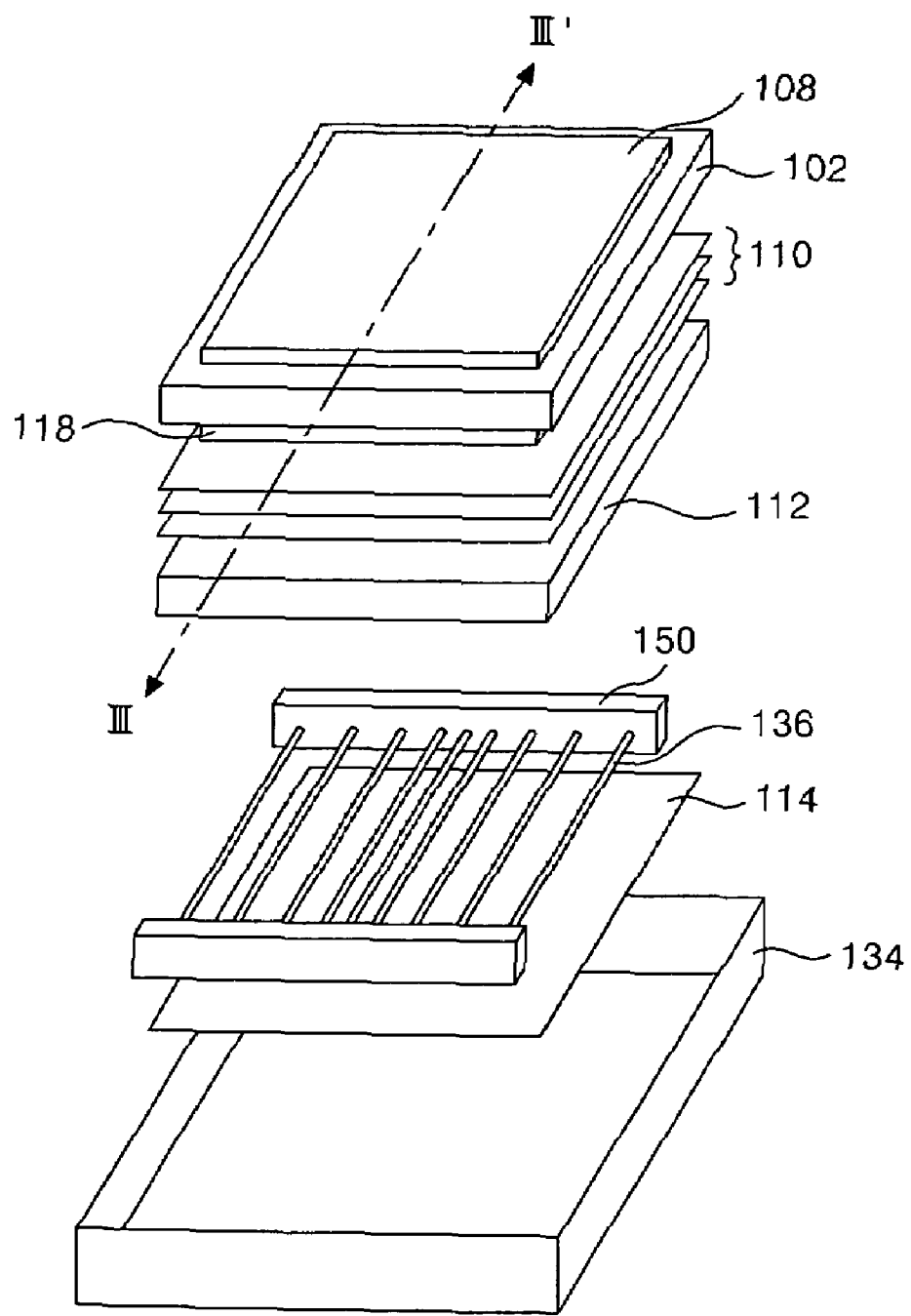
FIG. 2 is a perspective view of an exemplary liquid crystal display device according to an embodiment of the present invention.
Figure 3:
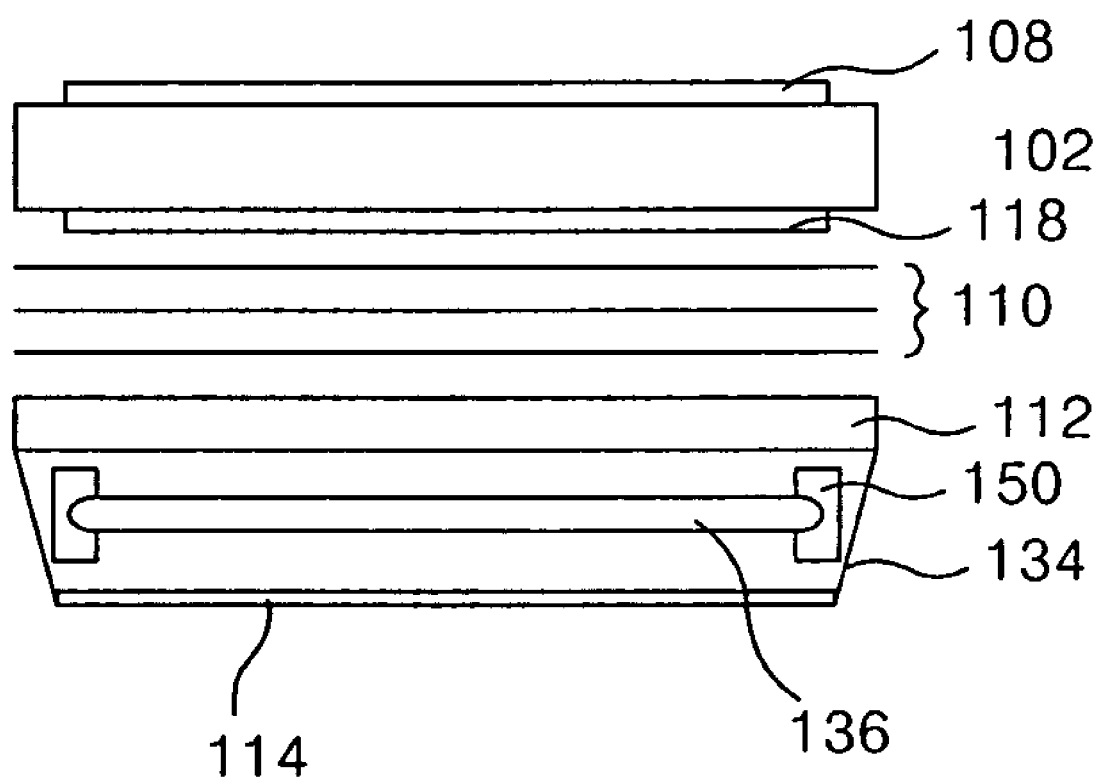
FIG. 3 is a cross-sectional view of the exemplary liquid crystal display device along line III-III' of FIG. 2.

FIG. 2 is a perspective view of an exemplary liquid crystal display device according to an embodiment of the present invention. FIG. 3 is a cross-sectional view of the exemplary liquid crystal display device along line III-III' of FIG. 2. Referring to FIGS. 2 and 3, a liquid crystal display device includes a liquid crystal display panel 102, and a backlight unit that irradiates light onto the liquid crystal display panel 102.

The liquid crystal display panel 102 has liquid crystal cells forming an active matrix between an upper substrate and a lower glass substrate, and a thin film transistor that switches a video signal applied to each of the liquid crystal cells. A refractive index of each liquid crystal cell is changed in accordance with the applied video signal to display a picture corresponding to the video signal. A tape carrier package TCP (not shown), is stuck onto a lower substrate of the liquid crystal display panel 102. A driver integrated circuit IC (not shown) is mounted on the TCP. The IC applies a drive signal to the thin film transistor. Polarizing sheets 108 and 118 are installed at the front and rear surfaces of the liquid crystal display panel 102, respectively. Herein, the polarizing sheets 108 and 118 improve the viewing angle of the liquid crystal display.

The backlight unit includes a plurality of lamps 136 powered by an external power source. The lamps 136 irradiate light onto the liquid crystal display panel 102, and are independently driven. A lamp holder 150 is provided to hold the lamps 136. The lamps 136 and the lamp holder 150 are placed in a case 134. A reflection plate 114 is installed between the lamp 136 and the case 134 to prevent light generated by the lamps 136 from leaking from under the case 134. A diffusion panel 112 diffuses light generated from the lamp 136, or reflected by the reflection plate 114, toward the liquid crystal display panel 102. A plurality of optical sheets 110 irradiates the diffused light from the diffusion panel to the liquid crystal display panel 102 and improves an output light efficiency of the diffusion panel 112.

Each of the lamps 136 includes a glass tube, a cathode and an anode. The cathode and the anode are provided at both ends of the glass tube, respectively. Phosphorus is spread over the inner wall of the glass tube. The glass tube is filled with an inert gas. An inverter is provided to apply an AC voltage to each of the lamps. Electrons radiated from the low voltage electrode collide with the inert gas inside the glass tube. The collisions caused the number of electrons to increase according to a geometric progression. Then, an electric current flows inside the glass tube due to the increase in the number of electrons. The electrons excite the inert gas. The excited inert gas emits an ultraviolet ray. The emitted ultraviolet ray collides with luminous phosphorus spread over the inner wall of the glass tube, thereby radiating visible rays. In embodiments of the present invention, the lamps 136 can have various shapes. For example, the lamps 136 can have a "U" shape or other shapes.

The lamp holder 150 supports and holds the lamps 136. The lamp holder 150 is placed in and fixed to the case 134. The case 134 houses the lamps 136 and the lamp holder 150. The reflection plate 114 is arranged between a bottom surface of the case 134 and the lamps 136. The reflection plate 114 reflects light generated from the lamps 136, and irradiates the reflected light toward the liquid crystal display panel 102, thereby improving light efficiency. The diffusion panel 112 is provided with a light pattern to disperse light generated from the lamps 136 or reflected by the reflection plate 114. The diffused light from the diffusion panel 112 progresses toward the liquid crystal display panel 102 with a wide angle.

The optical sheets 110 increase the brightness of the diffused light from the diffusion panel 112, thereby improving the brightness of the liquid crystal display device. Further, the optical sheets 110 transmits slantingly incident light, which is diffused from the diffusion panel 112 or reflected from the reflection sheet 114, vertically toward the liquid crystal display panel 102. In other words, the optical sheets 110 form a propagation direction for light exiting from the surface of the optical sheets 110.

Figure 4:
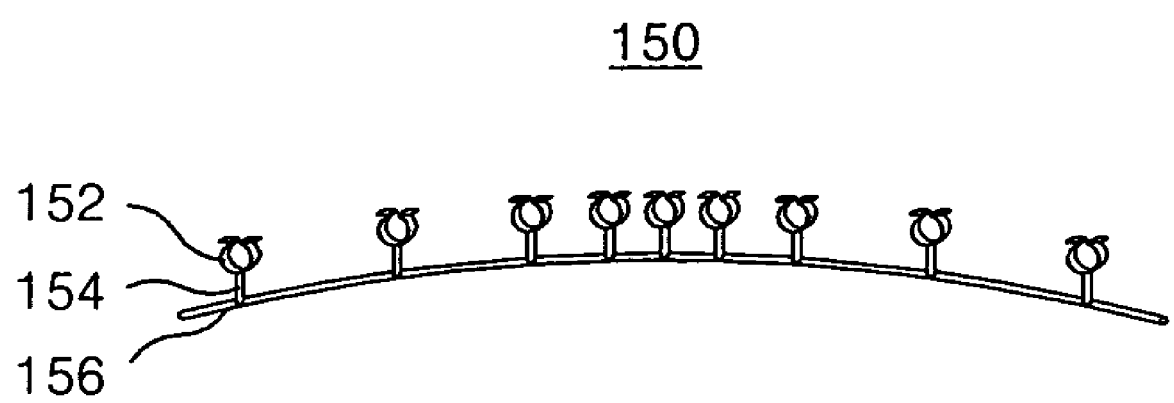
FIG. 4 shows an exemplary lamp holder for the liquid crystal display device of FIG. 2.

FIG. 4 shows an exemplary lamp holder for the liquid crystal display device of FIG. 2. Referring to FIG. 4, the lamp holder 150 includes a plurality of clipping parts 152 and supporting parts 154, and a base 156. The clipping parts 152 hold the ends of the lamps 136. Each of the supporting parts 154 is attached at one side of a corresponding one of the clipping part 152 and supports the corresponding one of the clipping parts 152. The base 156 fixes the plurality of the supporting parts 154.

Each of the clipping part 152 is shaped as a ring. Moreover, each of the clipping part 152 has an opening at one side. The clipping part 152 is made of an insulating material, for example, when the lamp 136 is a cold cathode fluorescent lamp CCFL. The clipping part 152 can be made of a conductive material to supply power to the lamp 136, for example, when the lamp 136 is of an external electrode type.

The base 156 is bent upward. The lamps 136 are concentrated at a central portion of the base 156. Each of the clipping part 152 and the corresponding supporting part 154 are disposed so that the distance between lamps 136 positioned at an edge is different from the distance between centrally positioned lamps.

Figure 5A:
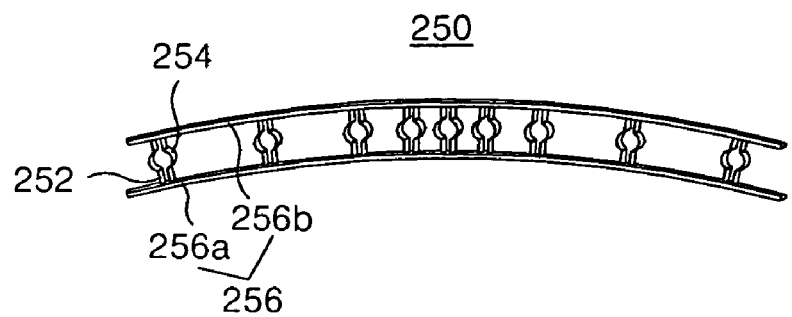
FIGS. 5A to 5C show exemplary shapes for the lamp holder according to embodiments of the present invention.
Figure 5B:
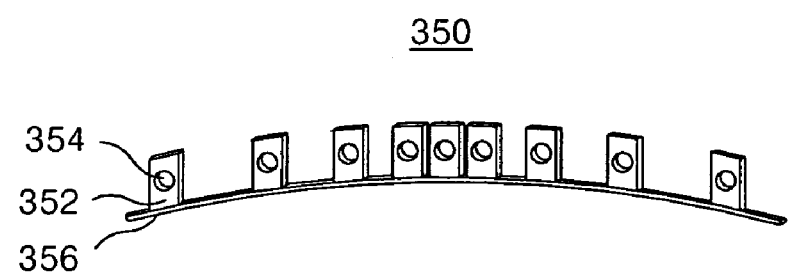
Figure 5C:
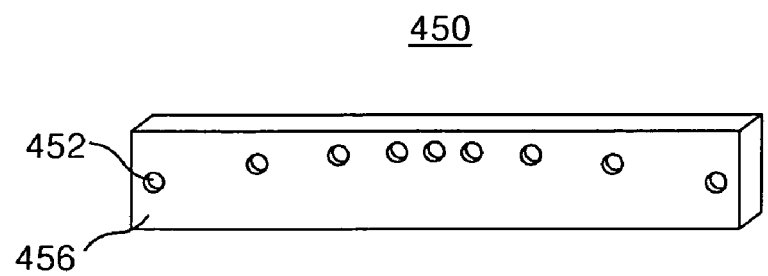

FIGS. 5A to 5C show exemplary shapes for the lamp holder according to embodiments of the present invention. As shown in FIGS. 5A to 5C, the lamp holder can have various shapes. For example, as shown in FIG. 5A, the lamp holder 250 may have H-shape. That is, the base 256 comprises of a lower base 256a and an upper base 256b. A pair of supporting parts 252 is linked between the lower base 256a and the upper base 256b. Further, each of the pair of supporting parts 252 has a half circled part at the middle portion so that a clipping part is formed by combining the faced two half circled middle parts of the pair of supporting parts 252. In another example, as shown in FIG. 5B, the lamp holder 350 may include a supporting part 352 in a plate shape extended from a base 356. A clipping hole 354 is formed at the center of the supporting part 352 for holding the lamp. Each of the lamps 136 can be inserted into a clipping hole 354 of the supporting part 352. In a further example, as shown in FIG. 5C, the lamp holder 450 may include a base 456 which has a rectangular block shape and is provided with a plurality of clipping holes 454. In this example, as the base and the supporting part are integrated in one body, the base 456 also plays a role of supporting part. The clipping holes 454 are provided at a front surface of the base 456. The two bases are faced each other with the front surface having the clipping holes. Each of the lamps 136 can be inserted into one of the clipping holes 454 provided on the base 456.

Figure 6:
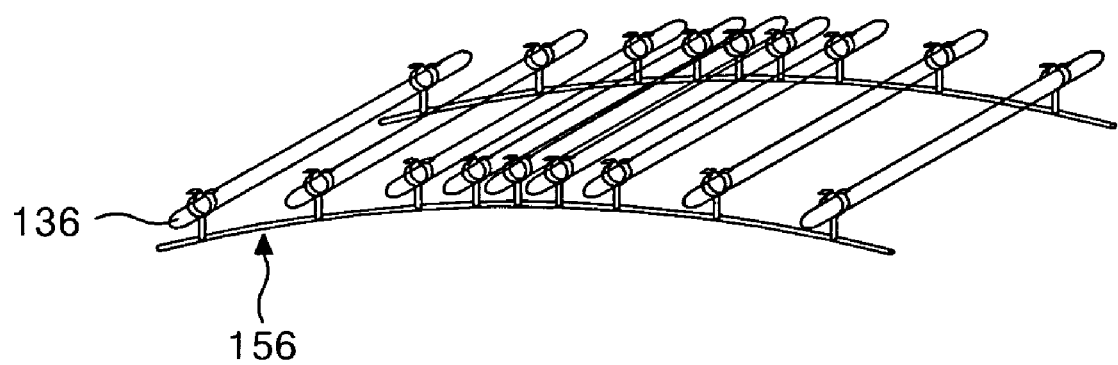
FIG. 6 is a diagram illustrating an exemplary arrangement of the lamps on the lamp holder according to an embodiment of the present invention.

FIG. 6 is a diagram illustrating an exemplary arrangement of the lamps on the lamp holder according to an embodiment of the present invention. Referring to FIGS. 3 and 6, lamp holders 150 are fixed at both edges of the case 134 (see FIG. 3). The lamps 136 are forcefully inserted into the clipping part 152 of the lamp holder 150. In this embodiment of the present invention, the clipping part 152 are similar in size to or slightly bigger than the diameter of the lamps 136, to prevent the lamps 136 from moving freely. The distance between adjacent clipping parts 152 is shorter at the central portion of the base 156 than at the edge of the base 156.

Accordingly, the distance between the lamps 136 inserted into the clipping part 152 increases toward the edges of the base 156 and is shorter toward the central portion of the base 156. Thus, the lamps 136 have a higher concentration in the central portion of the lamp holder. More lamps 136 are concentrated on the central portion of the case 134. Thus, the central portion of the display device has a higher brightness. In contrast, fewer lamps 136 are arranged at the edges of the case 134. Thus, the edges of the display device are dimmer than in the central portion of the display device.

The lamps 136 are installed at a specific height from the case 134. In this embodiment of the present invention, the heights of the supporting part 154 are different from each other. Thus, the lamps 136 are positioned at different distances from the case 134. Specifically, the supporting part 154 located at the edge are shorter than the supporting part 154 positioned in the central portion of the display device. Accordingly, the light irradiated from the lamps 136 in the central portion is brighter than the light irradiated from the lamp 136 located at the edges, with respect to the rear surface of the diffusion panel 112.

In embodiments of the present invention, as described above, the distance between adjacent lamps is shorter at a central portion of the display than at edges of the display, thereby providing higher brightness in the central portion. Accordingly, the perceived brightness is higher in the central portion, thereby providing an improved picture quality for the same power. Further, the light amount concentrated on the central portion is controlled and the power consumption at the edge part is reduced, thereby decreasing the overall power consumption.

It will be apparent to those skilled in the art that various modifications and variations can be made in the liquid crystal display panel having built-in driving circuit of the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:
    a plurality of lamps which generate light having a higher brightness in a central portion of the plurality of lamps;
    a case that houses the lamps; and
    a plurality of lamp holders at opposite ends of the case, the lamp holders holding the lamps, wherein a distance between first adjacent lamps is different from a distance between second adjacent lamps, and a distance of each of the lamps from a bottom surface of the case increases from an edge of the case to a center portion thereof.

2. The backlight unit for a liquid crystal display device according to claim 1, wherein the lamp holder further includes: a plurality of clipping means by which the lamps are held;
    a supporting means to support the clipping means; and
    a base mounted on the case, the supporting means being combined with the base.

3. The backlight unit for a liquid crystal display device according to claim 2, wherein a distance between the clipping means decreases from an edge of the base to a center of the base.

4. The backlight unit for a liquid crystal display device according to claim 2, wherein the clipping means is shaped as a ring and has an opening at one side thereof.

5. The backlight unit for a liquid crystal display device according to claim 2, wherein the lamps are cold cathode fluorescent lamps and the clipping means are formed of an insulating material.

6. The backlight unit for a liquid crystal display device according to claim 2, wherein the lamps are external electrode type lamps and the clipping means are formed of a conductive material.

7. The backlight unit for a liquid crystal display device according to claim 1, wherein the lamp holder includes a plurality of supporting means extended from a base mounted on the case, and a plurality of clipping holes formed at centers of the plurality of supporting means, whereas each of the lamps is inserted into the clipping hole of one of the plurality of supporting means.

8. The backlight unit for a liquid crystal display device according to claim 1, wherein the lamp holder includes a base having a rectangular block shape which is provided with a plurality of clipping holes at a front surface thereof, each of the lamps being inserted into one of plurality of the clipping holes.

9. The backlight unit for a liquid crystal display device according to claim 1, wherein the lamp holder includes a clipping means comprising a pair of facing half-circled bodies, a pair of supporting means supports the clipping means wherein, the pair of supporting means are combined between a lower base and an upper base.

10. A backlight unit for a liquid crystal display device, comprising:
 a plurality of lamps which generate light;
 a case that houses the lamps; and
 a plurality of lamp holders at opposite ends of the case, the lamp holders holding the lamps, wherein a distance of each of the lamps from a bottom surface of the case increases from an edge of the case to a center portion thereof, and a distance between first adjacent lamps is different from a distance between second adjacent lamps.

11. The backlight unit for a liquid crystal display device according to claim 10, wherein the lamp holder includes:
 a plurality of clipping means by which the lamps are held;
 supporting means to support the clipping means; and
 a base mounted on the case, the supporting means being combined with the base.

12. The backlight unit for a liquid crystal display device according to claim 11, the clipping means is shaped as a ring and has an opening on one side thereof.

13. The backlight unit for a liquid crystal display device according to claim 10, wherein a height of the clipping means increases from an edge of the case to a center of the case.

14. The backlight unit for a liquid crystal display device according to claim 10, wherein the lamp holder includes a plurality of supporting means extended from a base mounded on the case, and a plurality of clipping holes formed at centers of the plurality of supporting means, whereas each of the lamps is inserted into the clipping hole of one of the plurality of supporting means.

15. The backlight unit for a liquid crystal display device according to claim 10, wherein the lamp holder includes a base having a rectangular block shape which is provided with a plurality of clipping holes at a front surface thereof, each of the lamps being inserted into one of plurality of the clipping holes.

16. The backlight unit for a liquid crystal display device according to claim 10, wherein the lamp holder includes a clipping means comprising a pair of facing half-circled bodies, a pair of supporting means supports the clipping means wherein, the pair of supporting means are combined between a lower base and an upper base.

17. A liquid crystal display device, comprising:
 a liquid crystal display panel; and
 a backlight unit that irradiates light onto the liquid crystal display panel, wherein the backlight unit comprises:
 a plurality of lamps which generate the irradiated light;
 a case that houses the lamps;
 a plurality of lamp holders at opposite ends of the case, the lamp holders holding the lamps, wherein a distance between first adjacent lamps is different from a distance between second adjacent lamps, and a distance of each of the lamps from a bottom surface of the case increases from an edge of the case to a center portion thereof.

* * * * *